UNITED STATES PATENT OFFICE.

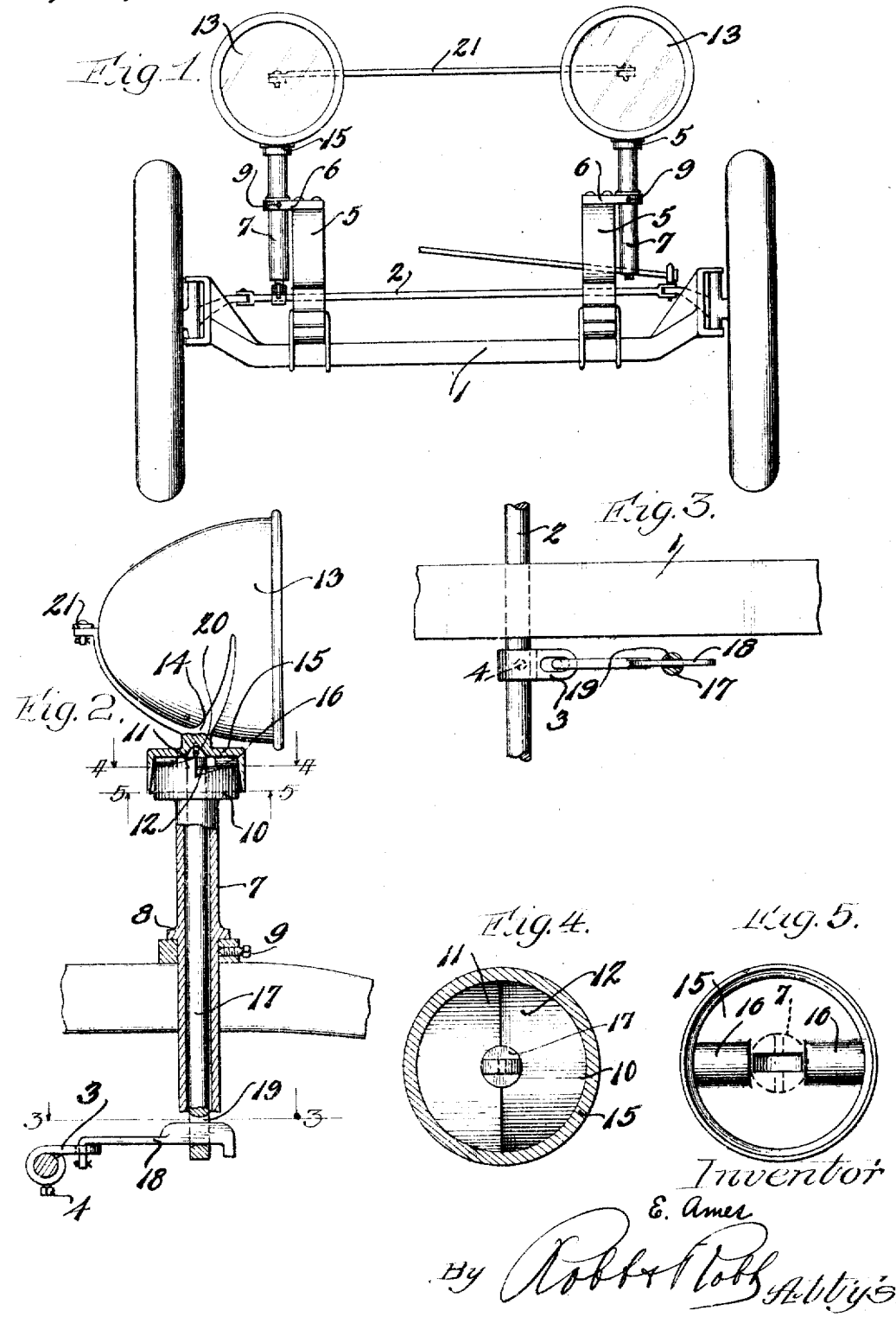

EDWARD AMES, OF TOLEDO, OHIO.

DIRIGIBLE-HEADLIGHT STRUCTURE.

1,283,020.

Specification of Letters Patent.

Patented Oct. 29, 1918.

Application filed November 27, 1917. Serial No. 204,195.

*To all whom it may concern:*

Be it known that I, EDWARD AMES, a citizen of the United States, residing at Toledo, in the county of Lucas and State of Ohio, have invented certain new and useful Improvements in Dirigible-Headlight Structures, of which the following is a specification.

The present invention has to do with improvements in dirigible headlight structures for vehicles as designed particularly for application to automobiles, and said invention has for its primary object the provision with means for shifting the light horizontally to follow the direction of movement of the vehicle, of means for tilting the light to cause a depression of the light beam so as to more directly and clearly illuminate the path.

With the above and other objects in view, this invention consists in the construction, combination and arrangement of parts all as hereinafter more fully described, claimed and illustrated in the accompanying drawings, in which:

Figure 1 is a front elevation showing the application of my invention to a vehicle support;

Fig. 2 is a side elevation of one of the lamp structures, portions being broken away and shown in section to more clearly disclose the details of construction;

Fig. 3 is a sectional view on the line 3—3 of Fig. 2; and

Figs. 4 and 5 are sectional views on the respective lines 4—4 and 5—5 of Fig. 2.

Referring to the drawing, 1 indicates the vehicle wheeled support and 2 the drag link of the steering mechanism therefor, on which is secured a clip 3, fastening by means of a set screw 4 or otherwise. The side frame members 5 of the vehicle are provided with laterally projecting brackets 6 in each of which is disposed a tubular standard 7. Each of these standards is formed with an annular flange 8 intermediate its length resting upon the brackets 6 and a set screw 9 extends through the bracket into engagement with the tubular standard for holding the same relatively stationary.

At the upper end each standard 7 is formed with an enlarged head 10 the upper surface of which has a pair of cams or inclinations 11 leading from recesses 12.

A lamp 13 is supported by each of the standards, being preferably mounted in a lamp holder 14 which is formed with a cap 15 engaging over the enlarged head of the standard 7. The cap is preferably cup-shaped and interiorly thereof are a pair of spaced lugs 16 which are adapted to ride upon the inclinations 11 hereinbefore referred to. An operating rod 17 extends upwardly through the hollow standard 7 and is connected by the link 18 with the clip 3. The link 18 extends through an aperture 19 and is so formed as to provide for relative movement of the parts as desirable in constructions of this character to accommodate for rising and falling of the running gear. The upper end of the rod 17 is pivotally connected to the lamp holder by the pin 20. A connecting rod 21 connects the lamps together so that the operation of one of the rods 17 through movement of the drag link 2 will impart corresponding movement to the lamps, both of which will turn in the direction of movement of the vehicle. Owing to the cam formation of the upper extremity of the standards 7 when the lamps are rotated in a horizontal plane, one lug of the lamp holder will ride upwardly upon an inclination while the opposite lug 16 will ride downwardly into a recess 12, this causing a tilting action of the lamp, the cap 15 of the lamp holder being suitably shaped to enable this tilting action. It will be apparent that as the vehicle turns the light rays from the lamp in addition to following the direction of movement will be thrown in a downward direction so as to illuminate more directly the path of travel immediately in front of the respective wheels. It is needless to indicate the advantages for this arrangement as it is quite generally known that such illumination of the immediate path of travel is very desirable in eliminating the dangers in rounding curves.

Having thus described my invention, what I claim as new is:

1. In a dirigible light structure for vehicles, the combination of a lamp, a supporting standard therefor terminating in a cam head, means for rotating said lamp, and a lamp holder having a cap fitting on said cam head and provided with means coöperating therewith for tilting the lamp upon rotation of the latter, said cap having pivotal connection with its standard and being so formed as to permit the tilting action aforesaid.

2. In a dirigible light structure for vehicles, the combination of a lamp, a hollow supporting standard therefor, means for fixing said standard relative to the vehicle, a lamp holder mounted on the upper end of said standard, said standard having depressions and cams leading therefrom with which the holder of the lamp coöperates to tilt the lamp, and an operative connection between the holder and the steering mechanism of the vehicle for rotating the lamp.

3. The combination with a vehicle and steering mechanism therefor, of a dirigible light structure comprising a hollow standard, a bracket in which said standard is supported having means for holding the standard in stationary position, a lamp supported upon said standard, an operating rod extending through the standard and having pivotal connection with the lamp, a link extending through the operating rod and connected with the steering mechanism of the vehicle, and means intermediate the standard and the lamp for tilting the latter when the lamp is rotated in a horizontal plane.

4. The combination with a vehicle and steering mechanism therefor, of a dirigible light structure comprising a hollow standard having an annular flange intermediate its length, a bracket with which said flange engages for supporting the standard, said standard having an enlarged head at its upper end formed with spaced cams, a lamp holder provided with a cap engaging about the enlarged head and having spaced lugs thereon engageable with the cams, and an operating rod extending through the standard, pivotally connected with the lamp holder at one end and operatively connected with the steering mechanism of the vehicle at the other end, whereby upon rotation of the lamp in a horizontal plane tilting of said lamp in a vertical plane is produced.

In testimony whereof I affix my signature.

EDWARD AMES.